US009189410B2

(12) United States Patent
Luo et al.

(10) Patent No.: US 9,189,410 B2
(45) Date of Patent: Nov. 17, 2015

(54) HYPERVISOR-BASED FLASH CACHE SPACE MANAGEMENT IN A MULTI-VM ENVIRONMENT

(71) Applicant: VMware, Inc., Palo Alto, CA (US)

(72) Inventors: Tian Luo, Columbus, OH (US); Deng Liu, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 285 days.

(21) Appl. No.: 13/897,269

(22) Filed: May 17, 2013

(65) Prior Publication Data

US 2014/0344504 A1 Nov. 20, 2014

(51) Int. Cl.
*G06F 12/02* (2006.01)
*G06F 12/08* (2006.01)
(52) U.S. Cl.
CPC ........ *G06F 12/0871* (2013.01); *G06F 12/0842* (2013.01); *G06F 2212/152* (2013.01); *G06F 2212/222* (2013.01); *G06F 2212/6042* (2013.01)
(58) Field of Classification Search
CPC .......................... G06F 12/0246; G06F 12/0842
USPC .......................................................... 711/103
See application file for complete search history.

(56) References Cited

U.S. PATENT DOCUMENTS 8,566,483 B1 * 10/2013 Chen et al. ........................ 710/18
8,874,848 B2 * 10/2014 Soundararajan et al. ..... 711/122
2011/0191522 A1 * 8/2011 Condict et al. ................. 711/103
2014/0052892 A1 * 2/2014 Klein et al. .................... 711/103

OTHER PUBLICATIONS http://www.vmware.com/products/vsphere/esxi-and-esx/index. html, viewed May 16, 2013.
Fusion Drive, http://en.wikipedia.org/wiki/Fusion Drive, May 8, 2013, viewed May 16, 1013.
Snia Iotta Repository, http://iotta.snia.org/, viewed May 17, 2013.
TPC Benchmark H, http://www.tpc.org/tpch/, viewed May 16, 2013.
UMass Trace Repository, http://traces.cs.umass.edu/index.php/Storage/Storage, Jun. 1, 2007, viewed May 16, 2013.
Steve Byan et al., "Mercury: Host-side flash caching for the data center", In MSST, pp. 1-12, 2012.
Mustafa Canim, et al., "SSD Bufferpool Extensions for Database Systems", Proceedings of VLDB, vol. 3, No. 2, pp. 1435-1446, 2010.
Feng Chen et al., "Hystor: Making the Best Use of Solid State Drives in High Performance Storage Systems", In ICS, pp. 22-32,2011.
Ajay Gulati, Ganesha Shanmuganathan, Xuechen Zhang, and Peter Varman, "Demand Based Hierarchical QoS Using Storage Resource Pools", In USENIX ATC, 2012.
Song Jiang et al., "Clock-pro: An effective improvement of the clock replacement", In USENIX Annual Technical Conference, General Track, pp. 323-336, 2005.
Song Jiang et al., "LIRS: an efficient low inter-reference recency set replacement policy to improve buffer cache performance", In SIGMETRICS, 31 pages, 2002.

(Continued)

*Primary Examiner* — Cheng-Yuan Tseng
*Assistant Examiner* — Zubair Ahmed

(57) ABSTRACT

Techniques for managing space in a flash storage-based cache are provided. In one embodiment, a computer system can calculate "ratio of effective cache space" (rECS) values for a plurality of VMs, where each VM has a cache allocation comprising a subset of a global pool of cache blocks in the flash storage-based cache, and where the rECS value for the VM indicates a proportion of the subset that has been populated with cached data and re-accessed by the VM within a current time window. The computer system can further determine a new cache allocation size for at least one VM in the plurality of VMs based on the rECS values. The computer system can then adjust the number of cache blocks in the at least one VM's cache allocation based on the new cache allocation size.

21 Claims, 7 Drawing Sheets

(56) References Cited

OTHER PUBLICATIONS

Stephen T. Jones et al., "Geiger: monitoring the buffer cache in a virtual machine environment", Proceedings of the 12th International Conference on Architectural Support for Programming Languages and Operating Systems, pp. 13-23, Oct. 21-15, 2006.

Ricardo Koller et al., "Write Policies for Host-side Flash Caches", 11th USENIX Conference on File and Storage Technolgoies (FAST), pp. 45-58, 2013.

Pin Lu et al., "Virtual Machine Memory Access Tracing with Hypervisor Exclusive Cache", USENIX Annual Technical Conference, pp. 29-43, 2007.

Tian Luo et al., "hStorage-DB: Heterogeneity-aware Data Management to Exploit the Full Capability of Hybrid Storage Systems", Proceedings of VLDB Endowment, vol. 5, No. 10, pp. 1076-1087, 2012.

Michael P. Mesnier et al., "Differentiated Storage Services", SOSP, pp. 57-70, Oct. 23-26, 2011.

Moinuddin K. Qureshi et al., "Utility-Based Cache Partitioning: A Low-Overhead, High-Performance, Runtime Mechanism to Partition Shared Caches". In MICRO, pp. 423-432, 2006.

Daniel Dominic Sleator et al., "Amortized efficiency of list update and pageing rules", Communications of the ACM, pp. 202-208, Feb. 1985.

Haoyu Song et al., "Fast hash table lookup using extended bloom filter: an aid to network processing", In SIGCOMM, pp. 181-192, 2005.

Andrew S. Tanenbaum, "Modern operating systems" (2. ed.), Prentice Hall, 2001.

Carl A. Waldspurger, "Memory Resource Management in VMware ESX Server", Proc. Fifth Symposium on Operating Systems Design and Implementation, 14 pages, Dec. 2002.

* cited by examiner

HYPERVISOR-BASED FLASH CACHE SPACE MANAGEMENT IN A MULTI-VM ENVIRONMENT

BACKGROUND

Hypervisor-based flash caching is a technology that enables the hypervisor of a server system to leverage flash storage to accelerate virtual machine (VM) I/O operations. In particular, the hypervisor can store, in a portion of a flash storage device referred to as a "flash cache," data that one or more VMs read from and/or write to virtual disks stored on, e.g., a traditional hard disk-based storage array. When the hypervisor detects a VM I/O request, the hypervisor can service the I/O request, if possible, from the flash cache rather than from the storage array. Since the I/O latency for flash storage access is typically several orders of magnitude less than the I/O latency for hard disk access, this caching mechanism can significantly improve VM I/O performance.

One of the challenges of implementing hypervisor-based flash caching in a server system that hosts multiple VMs involves managing the amount of flash cache space that is allocated to each VM (referred to as the VM's "cache allocation"). The size of this cache allocation represents the maximum amount of data that the flash storage device can hold for the VM; once this cap is reached, the hypervisor must begin evicting cached data from the VM's cache allocation in order to make room for additional data. A cache allocation size that is too small will decrease the utility of the flash cache for the VM because the hypervisor will delete a significant percentage of the VM's cached data before the VM can re-access it. On the other hand, a cache allocation size that is too large will unnecessarily consume space on the flash storage device—space that can be better utilized by being allocated to one or more other VMs.

SUMMARY

Techniques for managing space in a flash storage-based cache are provided. In one embodiment, a computer system can calculate "ratio of effective cache space" (rECS) values for a plurality of VMs, where each VM has a cache allocation comprising a subset of a global pool of cache blocks in the flash storage-based cache, and where the rECS value for the VM indicates a proportion of the subset that has been populated with cached data and re-accessed by the VM within a current time window. The computer system can further determine a new cache allocation size for at least one VM in the plurality of VMs based on the rECS values. The computer system can then adjust the number of cache blocks in the at least one VM's cache allocation based on the new cache allocation size.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes techniques that can be performed by the hypervisor of a server system for allocating/reallocating space in a flash storage-based cache (i.e., flash cache) among a plurality of VMs. In one embodiment, the hypervisor can initially allocate to each VM a subset of a "global pool" of cache blocks in the flash cache. The subset of cache blocks allocated to each VM can constitute the VM's cache allocation. The hypervisor can then collect, at server runtime, statistics regarding the I/O and caching activity of the VMs over recurring time windows and calculate, at the end of each time window, "ratio of effective cache space" (rECS) values for the VMs based on the collected statistics. The rECS value for each VM can reflect the proportion of cache blocks in the VM's cache allocation that have been populated with cached data and re-accessed. Upon calculating the rECS values with respect to a particular time window, the hypervisor can determine a new cache allocation size for at least one VM in the plurality of VMs based on the rECS values and historical data from one or more previous time windows. The hypervisor can then increase or decrease the number of cache blocks in the VM's cache allocation based on its new cache allocation size.

With the foregoing approach, the hypervisor can effectively and efficiently optimize the usage of space in the flash cache. For example, by relying on the rECS metric as a reference for space allocation/reallocation, the hypervisor can determine "fair" distributions of flash cache space among the VMs (i.e., distributions that maximize flash cache utilization across the VM pool) with greater accuracy than possible with other cache usage metrics, such as hit ratio. Further, since the hypervisor can execute the process above on a recurring basis (once per time window), the hypervisor can adjust VM cache allocations dynamically during server runtime to account for, e.g., changes in VM demands/workloads. Yet further, by taking into account historical data when determining new VM cache allocation sizes, the hypervisor can self-correct previous allocation decisions that may have led to sub-optimal flash cache usage.

Figure 1:
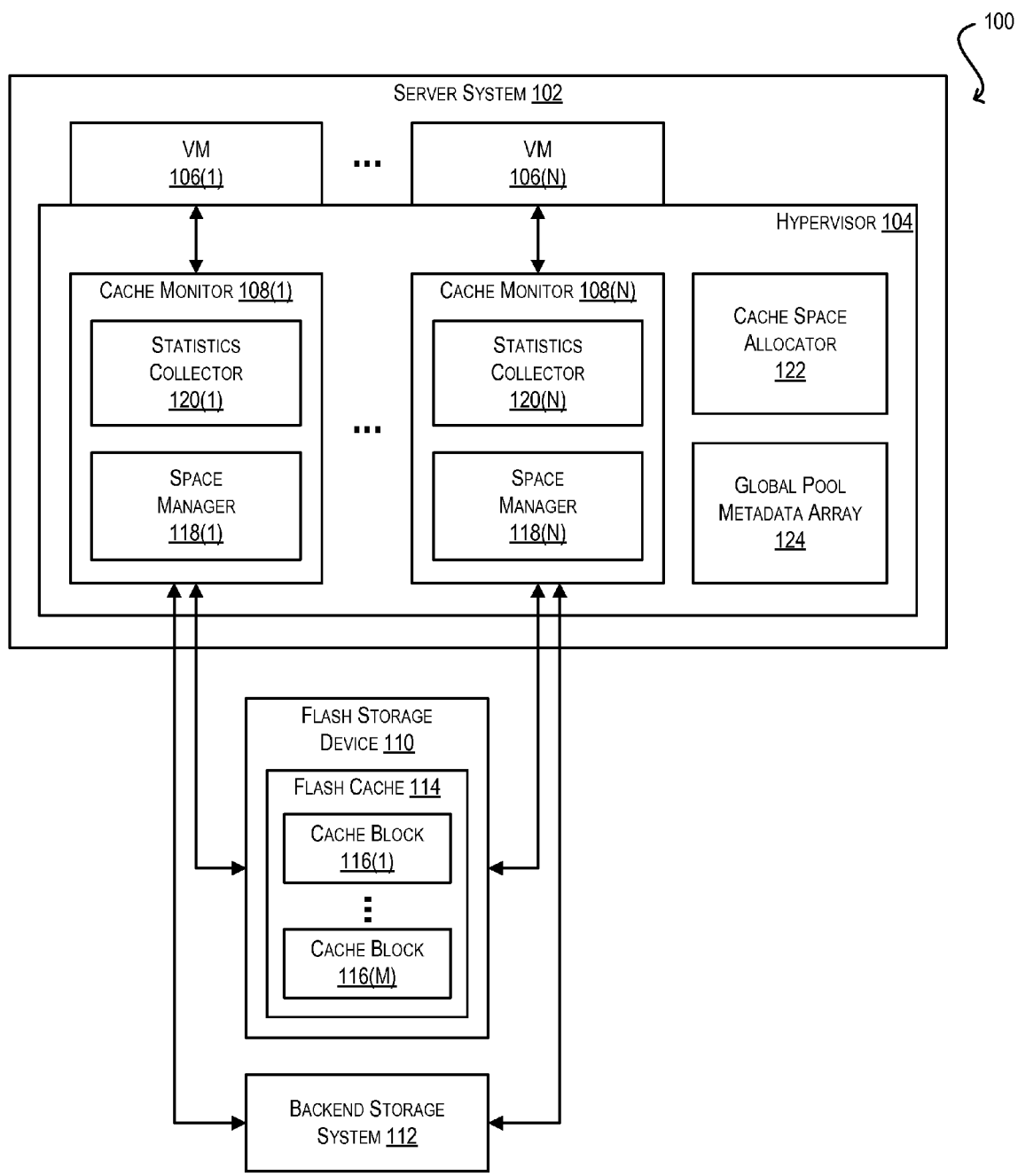
FIG. 1 depicts a block diagram of a system environment that supports hypervisor-based flash cache space management according to an embodiment.

FIG. 1 depicts a system environment 100 that supports hypervisor-based flash cache space management according to an embodiment. System environment 100 includes a server system 102 that executes a hypervisor 104 (also known as a "virtualization layer" or "virtualization software"). Hypervisor 104 provides an environment in which one or more VMs 106(1)-106(N) can run. In one embodiment, hypervisor 104 can interact directly with the hardware platform of server system 102 without an intervening host operating system. In this embodiment, hypervisor 104 can include a kernel (not shown) that manages VM use of the various hardware devices of server system 102. In an alternative embodiment, hypervisor 104 can be part of a "hosted" configuration in which hypervisor 104 runs on top of a host operating system (not shown). In this embodiment, hypervisor 104 can rely on the host operating system for physical resource management of hardware devices. One of ordinary skill in the art will recognize various modifications and alternatives for the design and configuration of hypervisor 104.

As shown in FIG. 1, hypervisor 104 includes a number of cache monitors 108(1)-108(N) that communicate with VMs 106(1)-106(N) (one cache monitor per VM) and two storage components—a flash storage device 110 and a backend storage system 112. Flash storage device 110 can be, e.g., a solid state disk (SSD), a PCIe-based flash card, a specialized flash appliance, or the like, and can include a flash cache 114 that comprises a plurality of fixed-size cache blocks 116(1)-116(M) (referred to collectively as the "global pool" of cache blocks). Each VM 106(i) can own (i.e., be allocated) a non-overlapping subset of cache blocks in the global pool (referred to as the VM's cache allocation). Backend storage system 112 can be, e.g., a traditional hard disk-based array, and can store one or more virtual disks (not shown) that VMs 106(1)-106(N) can access to read and write persistent data.

During the runtime of server system 102, each cache monitor 108(i) can leverage flash cache 114 in flash storage device 110 to accelerate I/O between its corresponding VM 106(i) and backend storage system 112. For example, a management component of cache monitor 108(i) (i.e., space manager 118(i)) can intercept a read request from VM 106(i) that is directed to backend storage system 112 and determine whether the requested data resides in VM 106(i)'s cache allocation within flash cache 114 (in other words, whether there is a "cache hit"). If so, space manager 118(i) can retrieve the data directly from flash cache 114 and return it to VM 106(i), without incurring the cost of a round-trip to/from backend storage system 112. If the requested data is not available in flash cache 114, space manager 118(i) can retrieve the data from backend storage system 112 and forward it to VM 106(i). In addition, space manager 118(i) can cache a copy of the data in VM 106(i)'s cache allocation so that the data can be more quickly retrieved in response to future I/O requests.

Figure 2:
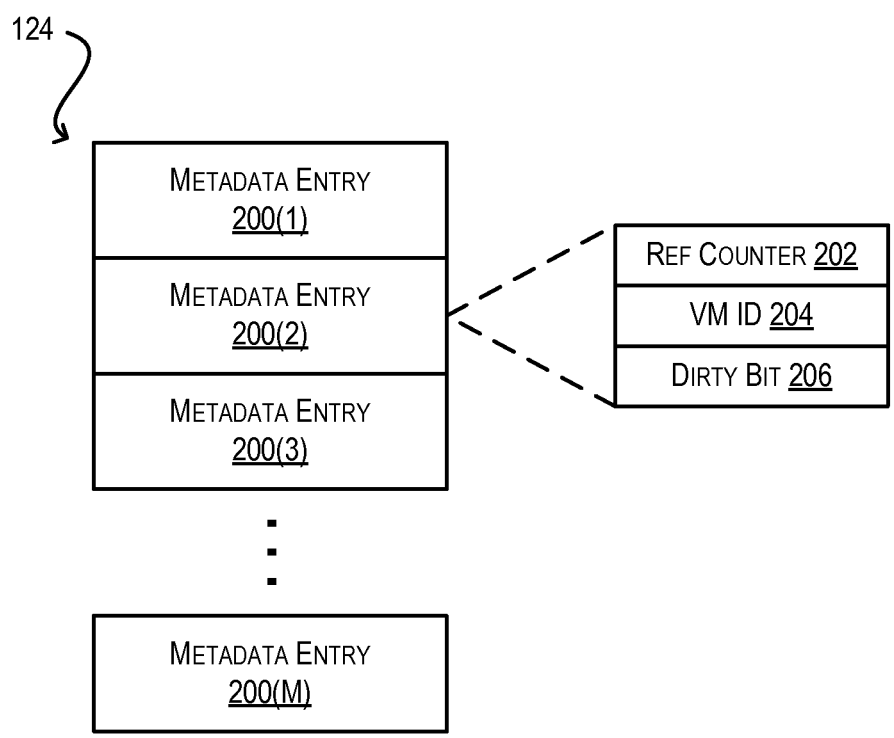
FIG. 2 depicts a block diagram of a global pool metadata array according to an embodiment.

In order to manage data eviction/replacement in flash cache 114, each space manager 118(i) can implement one of a plurality of known caching algorithms (e.g., least recently used (LRU), most recently used (MRU), random replacement, etc.). In the specific embodiment of FIG. 1, each space manager 118(i) can implement an instance of a "clock" algorithm (a variant of LRU) that makes uses of a global pool metadata array 124. FIG. 2 depicts the structure of global pool metadata array 124 according to an embodiment. As shown in FIG. 2, array 124 includes a plurality of metadata entries 200(1)-200(M) that map to cache blocks 116(1)-116(M) in the global pool of flash cache 114 (one metadata entry per cache block). Each metadata entry includes at least three fields: a reference counter 202, a VM ID 204, and a dirty bit 206. Reference counter 202 can store a value indicating whether the cache block corresponding to the metadata entry contains newly cached data (e.g., reference counter=0) or data that has been re-accessed (e.g., reference counter >0). VM ID 204 can identify the VM that currently owns the cache block (if the cache block is unallocated, VM ID can be set to NULL). And dirty bit 206 can indicate whether the cache block contains dirty data that needs to be flushed to backend storage system 112. In a particular embodiment, the reference counter field can consume 4 bits, the VM ID field can consume 4 bits, and the dirty bit field can consume 1 bit, resulting in a memory footprint of 9 bits per metadata entry.

Generally speaking, when space manager 118(i) receives a request from VM 106(i) for data that is already cached in a particular cache block of VM 106(i)'s cache allocation, space manager 118(i) can increment the reference counter of the metadata entry in global pool metadata array 124 corresponding to that cache block (thereby marking the cache block as being re-accessed).

On the other hand, when space manager 118(i) receives a request from VM 106(i) for data that is not cached in any cache block of VM 106(i)'s cache allocation (and therefore needs to be retrieved from backend storage system 112), space manager 118(i) can traverse global pool metadata array 124 to find an available cache block for holding the new data. As part of this process, space manager 118(i) can use a private pointer (referred to as a "private clock hand") to scan, in order, the metadata entries of global pool metadata array 124 that correspond to cache blocks in VM 106(i)'s cache allocation. If, for a particular metadata entry, the reference counter is set to 0 (indicating that the corresponding cache block has not yet been re-accessed), space manager 118(i) can evict the data currently stored in that cache block to make room for the new data. If the reference counter is greater than 0 (indicating that the corresponding cache block has been re-accessed one or more times), space manager 118(i) can reset the reference counter to 0 and move on to the next metadata entry. Space manager 118(i) can then evaluate the reference counter of the next metadata entry in the same manner and this process can continue until a cache block is selected for eviction (or an available cache block is found).

As suggested by the description above, all space managers 118(1)-118(N) can interact with the same global pool metadata array 124 for cache management—each space manager 118(i) can simply access the metadata entries of array 124 that are owned by its corresponding VM 106(i) (as indicated by the VM ID field) and can ignore the metadata entries owned by other VMs. In alternative embodiments, space managers 118(1)-118(N) can maintain separate metadata arrays (or other data structures) for implementing their respective private clock instances.

As noted in the Background section, a significant challenge with implementing hypervisor-based flash caching in a multi-VM environment such as environment 100 of FIG. 1 involves managing the amount of flash cache space that is allocated to each VM. Since the size of a VM's cache allocation dictates an upper bound on the amount of data that the flash cache can hold for the VM at a given time, these cache allocation sizes plays an important role in optimizing flash cache utilization. To address this, hypervisor 104 can include, in addition to cache monitors 108(1)-108(N)/space managers 118(1)-118(N), a number of statistics collectors 120(1)-120(N) (within cache monitors 108(1)-108(N) respectively) and a cache space allocator 122. As described in further detail below, space managers 118(1)-118(N), statistics collectors 120(1)-120(N), and cache space allocator 122 can act in concert to dynamically allocate/reallocate the cache blocks in flash cache 114 among VMs 106(1)-106(N) in an optimal or near-optimal manner.

Figure 3:
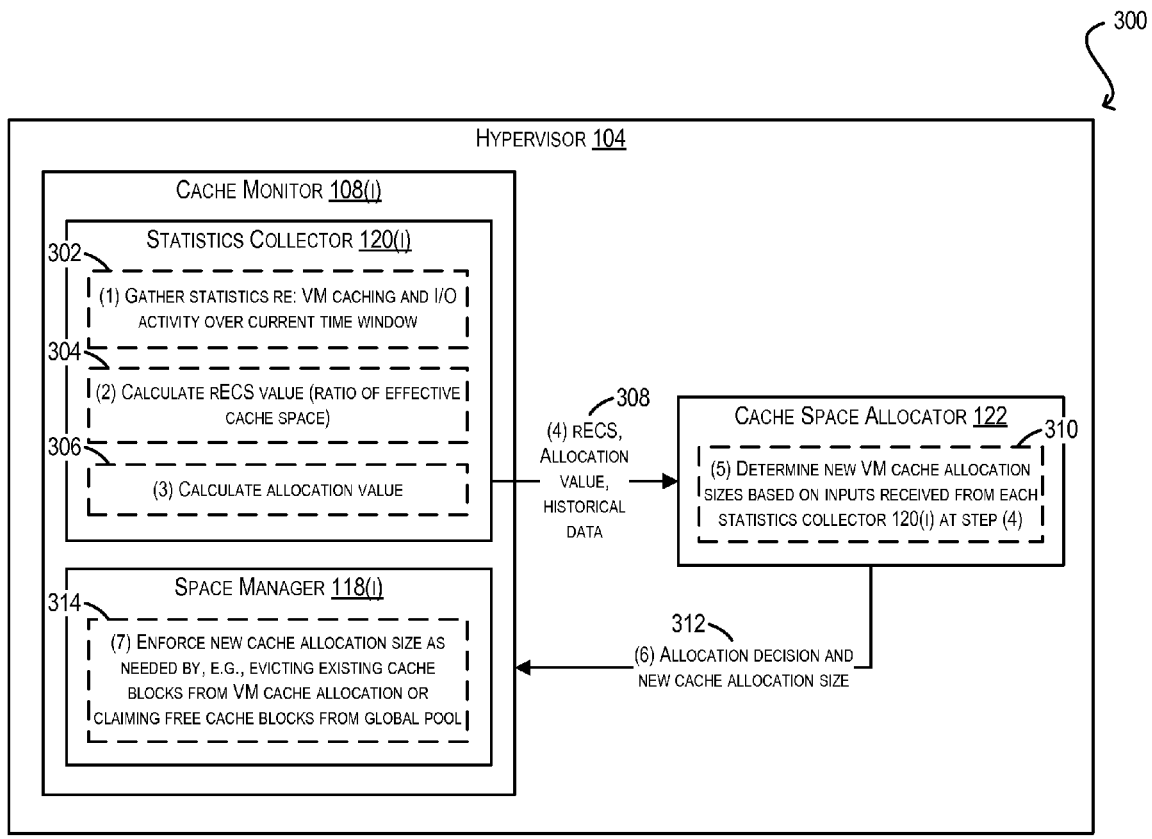
FIG. 3 depicts a flow within the system environment of FIG. 1 for allocating/reallocating flash cache space among multiple VMs according to an embodiment.

FIG. 3 depicts a flow 300 that explains, at a high-level, how space managers 118(1)-118(N), statistics collectors 120(1)-120(N), and cache space allocator 122 of hypervisor 104 can interoperate to enable flash cache space management according to an embodiment. At step (1) of flow 300 (reference numeral 302), each statistics collector 120(i) can gather statistics pertaining to its corresponding VM 106(i) over a time window during the runtime of server system 102 (referred to as the "current" time window). In one embodiment, the time window can correspond to a static interval (e.g., one second, ten seconds, one minute, ten minutes, etc.). In an alternative embodiment, the time window can correspond to a variable length interval, such an interval that is defined by the occurrence of one or more events (e.g., the receipt of a predefined number of I/O requests from VM 106(*i*)).

Generally speaking, the statistics that statistics collector 120(*i*) gathers at step (1) can comprise both VM caching statistics and VM I/O statistics. The VM caching statistics can include, e.g., (1) the total number of cache blocks in VM 106(*i*)'s cache allocation and (2) the number of cache blocks in VM 106(*i*)'s cache allocation that space manager 118(*i*) has populated with cached data and re-accessed. In a particular embodiment, statistics collector 120(*i*) can gather (1) and (2) by accessing metadata entries in global pool metadata array 124, which is described with respect to FIG. 4 below. The VM I/O statistics can include, e.g., the number of I/O requests generated by VM 106(*i*) and the number of data blocks that space manager 118(*i*) has retrieved from backend storage system 112 in response to those I/O requests.

Once the current time window (and thus the statistics gathering process) has ended, statistics collector 120(*i*) can calculate a "ratio of effective cache space" (rECS) value for VM 106(*i*) based on the VM caching statistics noted above (step (2), reference numeral 304). The rECS value can reflect the proportion (e.g., percentage) of cache blocks in VM 106(*i*)'s cache allocation that are relatively "hot"—in other words, cache blocks that have been recently re-accessed by VM 106(*i*). For example, if statistics collector 120(*i*) determined at step (1) that VM 106(*i*)'s cache allocation has K total cache blocks and that VM 106(*i*) re-accessed J cache blocks during the current time window, the statistics collector can compute the rECS value as:

$$\frac{J}{K} * 100\%$$

In addition to rECS, statistics collector 120(*i*) can also calculate an "allocation value" for VM 106(*i*) based on the VM I/O statistics collected at step (1) (step (3), reference numeral 306). The allocation value can reflect the estimated amount by which VM 106(*i*)'s cache allocation should increase or decrease for the next time window (if a change in cache allocation size is warranted). Ideally, the allocation value should be sufficiently large (in the case of an allocation size increase) to accommodate new data, but should also be sufficiently small (in the case of an allocation size decrease) to avoid an unexpected performance loss. Thus, in one embodiment, the allocation value can be based on the number of data blocks that space manager 118(*i*) has recently retrieved from backend storage system 112 (i.e., the volume of I/O that resulted in a "cache miss"). An example algorithm for computing the allocation value in this manner is described with respect to FIG. 5 below.

Once statistics collector 120(*i*) has completed its calculation of rECS and allocation values at steps (2) and (3), statistics collector 120(*i*) can transmit these values, in addition to historical data, to cache space allocator 122 (step (4), (reference numeral 308)). The historical data can include, e.g., rECS values and allocation decisions for VM 106(*i*) from one or more previous time windows. Cache space allocator 122 can then determine new cache allocation sizes for one or more of VMs 106(1)-106(N) based on the inputs received from all statistics collectors 120(1)-120(N) (step (5), reference numeral 310)). As part of this step, cache space allocator 122 can "smooth out" the current rECS values in view of prior rECS values, as well cross-compare changes in rECS values between VMs 106(1)-106(N), via an algorithm shown in FIG. 6 below.

At step (6) of flow 300 (reference numeral 312), cache space allocator 122 can communicate the new cache allocation sizes determined at step (5) (along with allocation decisions indicating an "increase" or "decrease" in cache allocation size) to the affected cache monitors (i.e., the cache monitors whose corresponding VMs have a new cache allocation size). If the cache allocation size of VM 106(*i*) has changed, at step (7) (reference numeral 314) space manager 118(*i*) can enforce VM 106(*i*)'s new cache allocation size by removing cache blocks from VM 106(*i*)'s cache allocation, or claiming free cache blocks from the global pool of flash cache 114, as needed. In various embodiments, space manager 118(*i*) can perform this enforcement concurrently with servicing I/O requests from VM 106(*i*).

Finally, flow 300 can return to step (1) so that the entire allocation process can be repeated for subsequent time windows. In addition, although not shown, statistics collector 120(*i*) can store the new cache allocation size and allocation decision received at step (6) for use as historical data inputs to cache space allocator 122 during the next time window.

With the approach depicted in FIG. 3, hypervisor 104 can allocate/reallocate flash cache space among VMs 106(1)-106(N) with a high degree of effectiveness for a number of reasons. First, the novel rECS metric that each statistics collector 120(*i*) calculates at step (2) is generally a more accurate indicator of VM cache space demand than other cache usage metrics, such as hit ratio (i.e., the ratio of I/O requests that result in a cache hit). To appreciate this, consider four distinct scenarios: scenario (1) in which both the hit ratio and rECS value for a VM increase over time; scenario (2) in which both the hit ratio and rECS value for the VM decrease over time; scenario (3) in which the hit ratio increases while the rECS value decreases; and scenario (4) in which the hit ratio decreases while the rECS value increases.

In scenarios (1) and (2), the hit ratio and rECS metrics both move in the same direction, and both suggest the same (correct) cache allocation decision (allocation size increase in (1) and allocation size decrease in (2)). However, in scenario (3), the increasing hit ratio and the decreasing rECS value collectively indicate that the I/O locality for the VM's workload is increasing, while the overall working set size is shrinking. Thus, in this scenario, it makes most sense to decrease the VM's cache allocation size, which is correctly suggested by the decreasing rECS value (and is contrary to the increasing hit ratio). Conversely, in scenario (4), the decreasing hit ratio and the increasing rECS value collectively indicate that VM is accessing new data, while previous "hot" blocks that used to be accessed frequently are now being accessed less frequently. Thus, in this scenario, it makes most sense to increase the VM's cache allocation size, which again is correctly suggested by the increasing rECS value (and is contrary to the decreasing hit ratio). Since the rECS metric suggests the correct allocation decision in all four scenarios above (while the hit ratio metric only suggests the correct allocation decision in scenarios (1) and (2)), rECS is a superior reference point for determining cache allocation sizes.

Second, as noted previously, hypervisor 104 can invoke flow 300 of FIG. 3 on a recurring basis during the runtime of server system 102 (once per time window). This allows hypervisor 104 to adapt to changing VM dynamics and to adjust the sizes of the VM cache allocations appropriately.

For example, a VM whose cache space demand increases over time can be granted more flash cache space in subsequent time windows, while a VM whose cache space demand decreases over time can be granted less flash cache space in subsequent time windows.

Third, by using historical data as inputs when determining new cache allocation sizes, cache space allocator 122 can use prior allocation decisions as feedback for modifying future allocation decisions (e.g., a proper decision can be continued, while a wrong decision can be corrected). This feedback mechanism can ensure that cache space allocator 122 ultimately arrives at an optimal or near-optimal cache allocation size for each VM 106(i), regardless of previous allocation mistakes.

Figure 4:
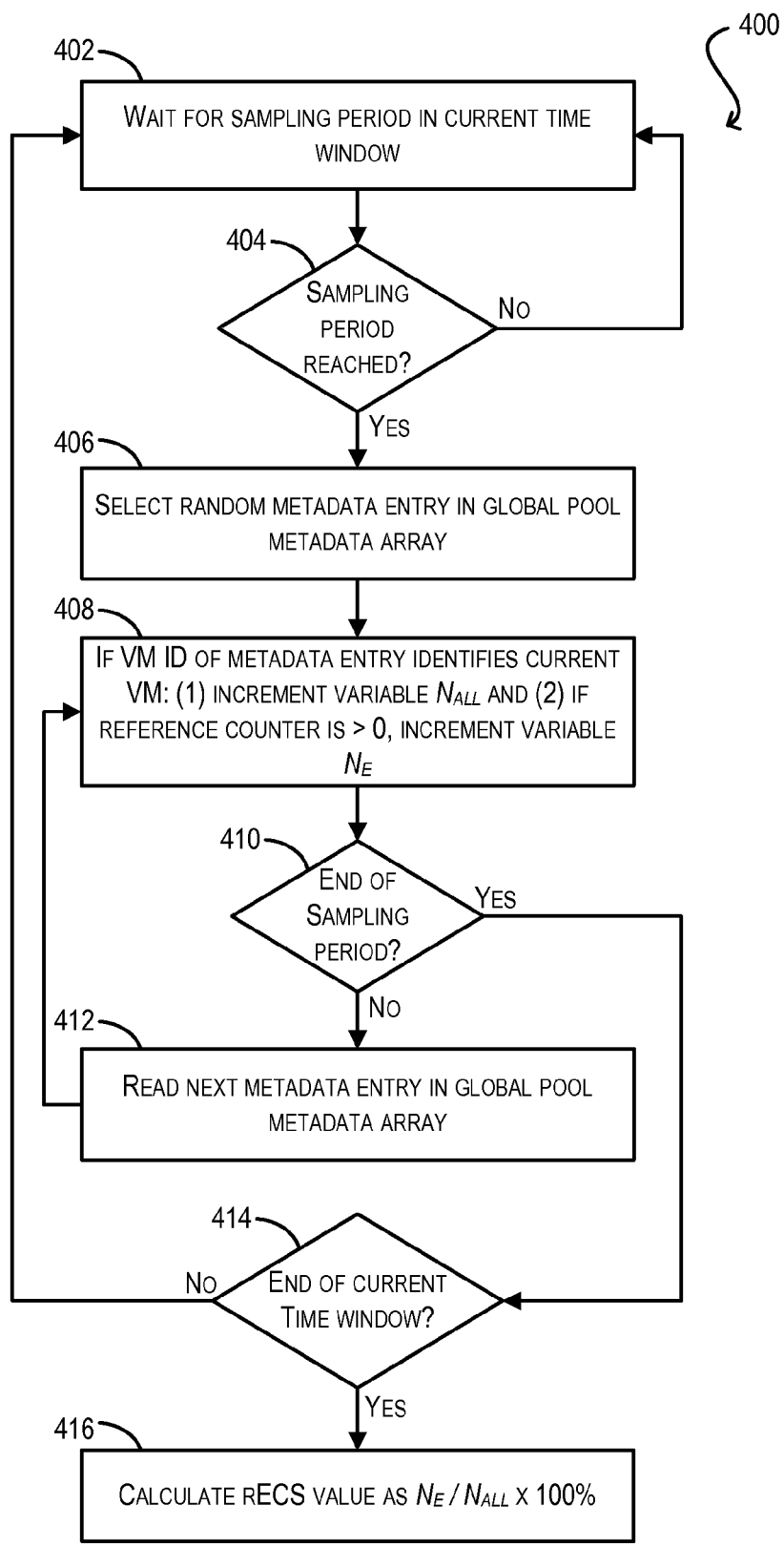
FIG. 4 depicts a flowchart for collecting VM caching statistics and calculating a rECS value according to an embodiment.

The remaining sections of this disclosure provide example implementations of the various steps/processes described in flow 300 of FIG. 3. For instance, FIG. 4 depicts a flowchart 400 that can be performed by each statistics collector 120(i) for gathering caching statistics and calculating a rECS value for VM 106(i) per steps (1) and (2) of flow 300 according to an embodiment. In the specific embodiment of FIG. 4, statistics collector 120(i) uses a sampling technique that scans a subset of metadata entries in global pool metadata array 124 in order to estimate the total cache block count and re-accessed cache block count needed for rECS computation. This sampling technique strikes a tradeoff between efficiency and accuracy, because in some situations the overhead for performing a full scan of all metadata entries in global pool metadata array 124 (and thus, calculating a completely accurate rECS value) may be too high. In other situations, the time window in flow 300 may be too short (e.g., one second) to complete a full scan of array 124.

At blocks 402 and 404, statistics collector 120(i) can enter a loop and wait for the start of a sampling period within the current time window. The sampling period can be predefined (e.g., occur at the same point within each time window) or can be randomized. In certain embodiments, multiple sampling periods can be defined for each time window. In these embodiments, statistics collector 120(i) can optionally enforce an idle interval between each sampling period in order to, e.g., reduce system overhead and to prevent "oversampling" (i.e., situations where the same metadata entry is counted twice in a single time window due to excessively frequent sampling).

When the start of the sampling period is reached, statistics collector 120(i) can select a random metadata entry in global pool metadata array 124 (block 406). If the selected metadata entry does not identify VM 106(i) as its owner (via the VM ID field), statistics collector 120(i) can skip this metadata entry. Otherwise, statistics collector 120(i) can perform a two-step process as shown in block 408. First, statistics collector 120(i) can increment a variable $N_{all}$, which is a running sum of the estimated total number of cache blocks allocated to VM 106(i). Second, statistics collector 120(i) can check the reference counter field of the metadata entry. If the reference counter is greater than 0, statistics collector 120(i) can also increment a variable $N_e$, which is a running sum of the estimated number of cache blocks VM 106(i) has re-accessed during the current time window.

After performing the metadata entry processing of block 408, statistics collector 120(i) can check whether the sampling period has ended (block 410). If not, statistics collector 120(i) can read the next sequential metadata entry in global pool metadata array 124 (block 412) and return to block 408. On the other hand, if the sampling period has ended, statistics collector 120(i) can check whether the current time window has ended (block 414).

If the current time window has ended, statistics collector 120(i) can return to block 402 to wait for the next sampling period (if another sampling period exists within the current time window). Otherwise, statistics collector 120(i) can end its statistics gathering process and calculate the rECS value for VM 106(i) as $N_e/N_{all} \times 100\%$. Statistics collector 120(i) can also reset the values for $N_{all}$ and $N_e$ to 0 after block 416 so that these variables can be used to recalculate rECS in a subsequent time window.

Although flowchart 400 is described above as being performed by each statistics collector 120(i), in some embodiments flowchart 400 can be performed by a single entity within hypervisor 104 (e.g., a "global pool manager"). In these embodiments, the global pool manager can maintain multiple copies of variables $N_{all}$ and $N_e$ (one per VM) and, upon encountering a metadata entry owned by a particular VM at block 408, can update the appropriate $N_{all}$ and/or $N_e$ variables for that VM. Then, at the end of the time window, the global pool manager can transmit $N_{all}$ and $N_e$ for each VM 106(i) to its corresponding statistics collector 120(i) for rECS calculation. With this alternative approach, there is no need to skip metadata entries during the scanning of global pool metadata array 124; rather, the information in each metadata entry can be captured and communicated to the appropriate statistics collector.

Figure 5:
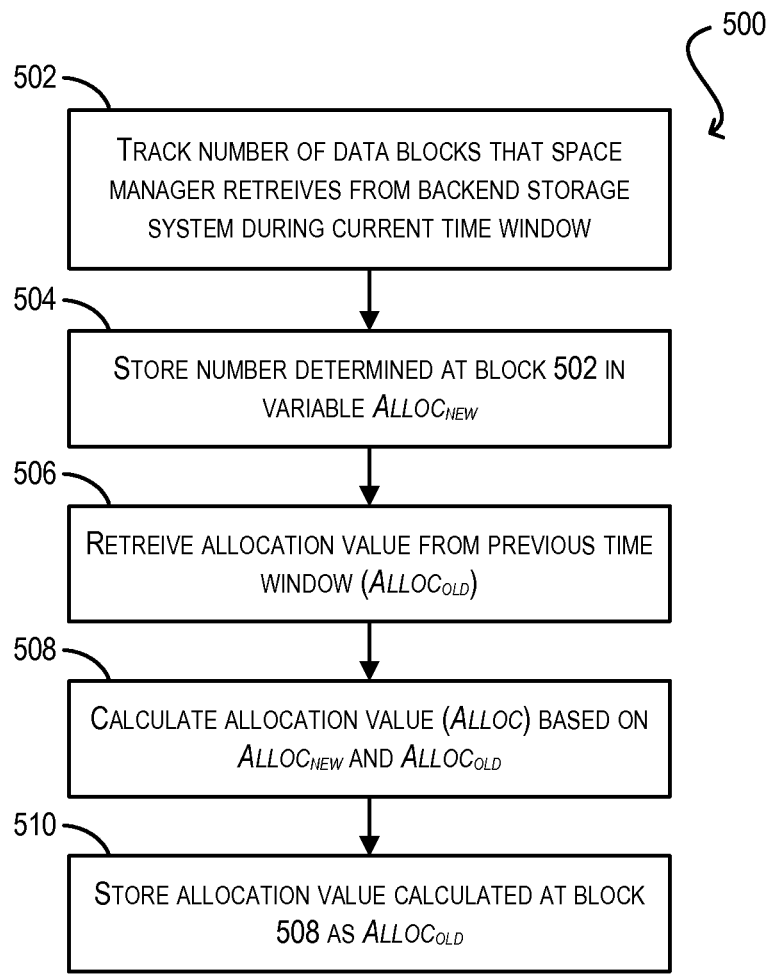
FIG. 5 depicts a flowchart for collecting VM I/O statistics and calculating an allocation value according to an embodiment.

FIG. 5 depicts a flowchart 500 that can be performed by each statistics collector 120(i) for gathering I/O statistics and calculating an allocation value for VM 106(i) per steps (1) and (3) of flow 300 according to an embodiment. In one embodiment, statistics collector 120(i) can perform flowchart 500 concurrently with flowchart 400 of FIG. 4.

At block 502, statistics collector 120(i) can track the number of data blocks that space manager 118(i) retrieves from backend storage system 112 over the current time window. As noted with respect to step (3) of flow 300, this statistic essentially identifies the volume of data requested by VM 106(i) that results in a cache miss, and thus serves as a reasonably accurate indicator of the amount by which VM 106(i)'s cache allocation should be increased/decreased for the next time window.

At block 504, statistics collector 120(i) can store the number determined at block 502 in a variable $Alloc_{new}$. Further, at block 506, statistics collector 120(i) can retrieve a historical allocation value that it calculated for VM 106(i) in a prior time window (represented by variable $Alloc_{old}$).

Once $Alloc_{new}$ and $Alloc_{old}$ have been determined, statistics collector 120(i) can calculate the allocation value for VM 106(i) based on a combination of these two variables (block 508). By taking into account both $Alloc_{new}$ and $Alloc_{out}$ in this calculation, statistics collector 120(i) can average out the I/O throughput from backend storage system 112 over multiple time windows, and thus avoid an allocation value that is too large or too small due to, e.g., transient I/O spikes or lulls. In a particular embodiment, statistics collector 120(i) can calculate the allocation value (Alloc) as follows:

$$Alloc = Alloc_{old} * b + Alloc_{new} * (b-1)$$

In the equation above, parameter b is a "smoothing" parameter for weighing the respective contributions of $Alloc_{new}$ and $Alloc_{out}$ to the current allocation value. In one embodiment, parameter b can be set to 0.5 in order to give each variable an equal weight. In other embodiments, the value of parameter b can be increased or decreased as needed in view of the I/O trends between cache monitor 108(i) and backend storage system 112.

Finally, at block 508, statistics collector 120(i) can store the allocation value calculated at block 508 in variable Alloc$_{out}$ for use during the next time window.

Figure 6:
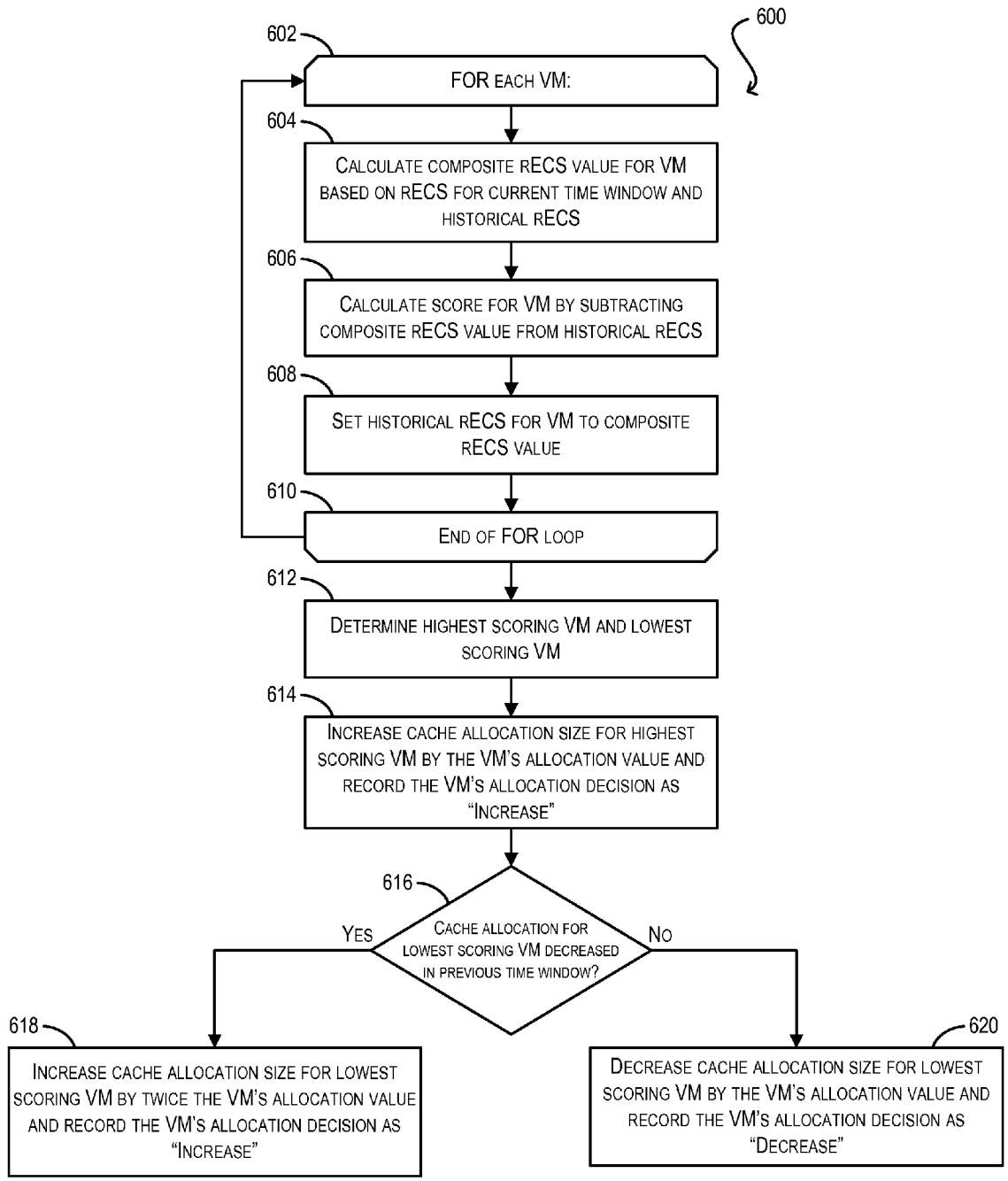
FIG. 6 depicts a flowchart for determining new VM cache allocation sizes according to an embodiment.

FIG. 6 depicts a flowchart 600 that can be performed by cache space allocator 122 for determining new VM cache allocation sizes per step (5) of flow 300 according to an embodiment. Prior to the execution of flowchart 600, it is assumed that cache space allocator 122 has received the following inputs from statistics collectors 120(1)-120(N): (1) a current rECS value for each VM 106(i), (2) a historical rECS value for each VM 106(i), (3) a current cache allocation size for each VM 106(i), and (4) a historical allocation decision (e.g., "Increase" or "Decrease") for each VM 106(i).

At block 602, cache space allocator 122 can enter a loop for each VM 106(i) in the VM pool 106(1)-106(N). Within the loop, cache space allocator 122 can first calculate a composite rECS value for VM 106(i) based on VM 106(i)'s current rECS value ($E_{new}$) and VM 106(i)'s historical rECS value ($E_{old}$) (block 604) Like the allocation value calculation discussed with respect to FIG. 5, the composite rECS value calculation can essentially average out the rECS values for VM 106(i) across multiple time windows. This averaging can be useful when the sampling technique described with respect to FIG. 4 is used, since the rECS value computed for each time window will be an estimated (rather than a completely accurate) value, and thus the averaging can smooth out inaccurate rECS values due to sampling errors. In a particular embodiment, cache space allocator 122 can calculate the composite rECS value for VM 106(i) ($E(VM_i)$) as follows:

$$E(VM_i) = E_{old}(VM_i)*a + E_{new}(VM_i)*(a-1)$$

In the equation above, parameter a is a smoothing parameter for weighing the respective contributions of $E_{old}(VM_i)$ and $E_{new}(VM_i)$ to $E(VM_i)$. In one embodiment, parameter a can be set to 0.8 in order to give the historical rECS value greater weight than the current rECS value.

Once cache space allocator 122 has calculated the composite rECS value, cache space allocator 122 can calculate a score for VM 106(i) by subtracting the composite rECS value from the historical rECS value (block 606). This score essentially represents the change in rECS from the previous time window to the current time window. Cache space allocator 122 can then set the historical rECS value to the composite rECS value and the loop can end (blocks 608, 610).

At block 612, cache space allocator 122 can evaluate the scores for all of the VMs calculated at block 608 within the FOR loop and determine the highest scoring VM and the lowest scoring VM. Cache space allocator 122 can then adjust the cache allocation sizes of these two VMs accordingly. For example, at block 614, cache space allocator 122 can increase the cache allocation size for the highest scoring VM by the VM's allocation value calculated per flowchart 500 of FIG. 5. As part of this step, cache space allocator 122 can also record the current allocation decision for the VM to "Increase."

At block 616, cache space allocator 122 can check the historical allocation decision for the lowest scoring VM to determine whether the cache allocation size for that VM was decreased in the previous time window. If so, cache space allocator 122 can determine that the historical allocation decision was erroneous and therefore can increase the cache allocation size for the lowest scoring VM by twice its allocation value (or by some other multiple of the allocation value) (block 618). In this way, cache space allocator 122 can self-correct its previous allocation mistake. In addition, cache space allocator 122 can record the current allocation decision as "Increase."

On the other hand, if the cache allocation size for the lowest scoring VM was not decreased in the previous time window, cache space allocator 122 can proceed with decreasing the VM's cache allocation size by its allocation value and record the current allocation decision as "Decrease" (block 620).

In some situations, the processing performed at blocks 614-620 can cause the sum total of the cache allocation sizes for VMs 106(1)-106(N) to exceed the size of the global pool in flash cache 114. In these cases, cache space allocator 122 can execute a reconciliation process after block 618/620 (not shown) for decreasing the size of each VM's cache allocation until all VM cache allocations are able to fit within the global pool.

Figure 7:
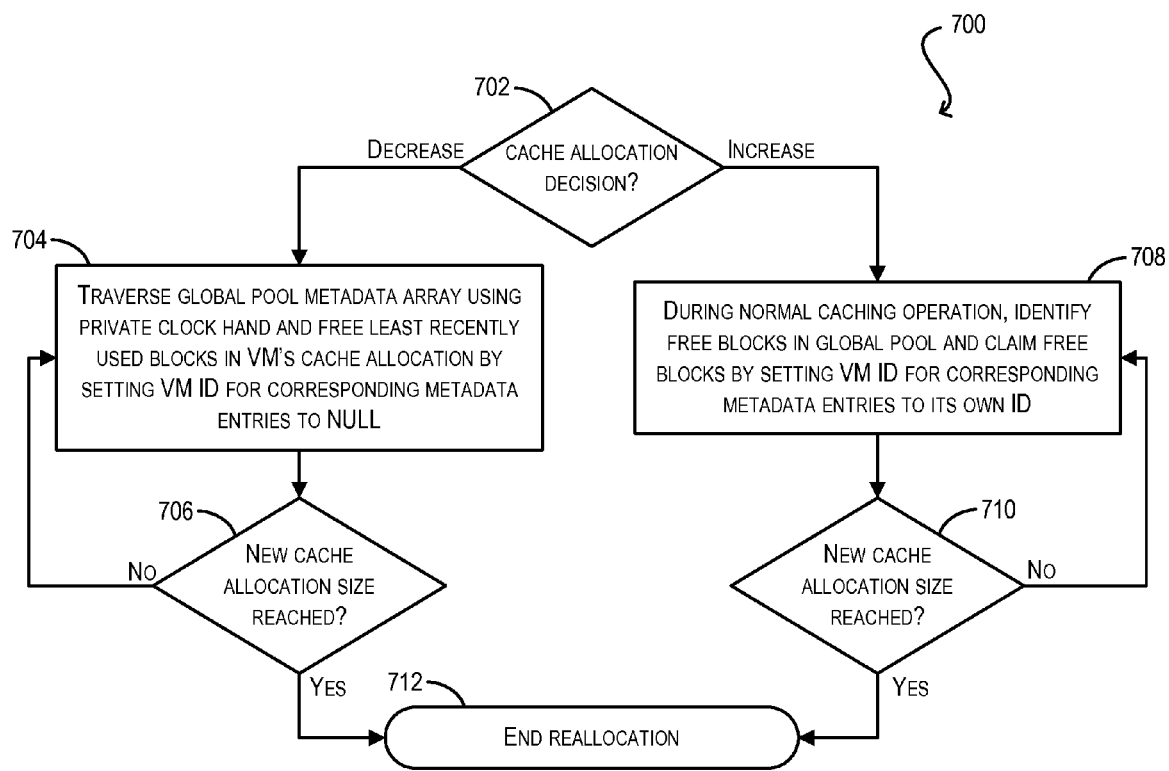
FIG. 7 depicts a flowchart for adjusting the number of cache blocks in a VM's cache allocation according to an embodiment.

FIG. 7 depicts a flowchart 700 that can be performed by each space manager 118(i) for enforcing a new cache allocation size for its corresponding VM 106(i) per step (7) of flow 300 according to an embodiment.

At block 702, space manager 118(i) can determine whether the current allocation decision for VM 106(i) is an "Increase" or a "Decrease." If the allocation decision is "Decrease," space manager 118(i) can traverse global pool metadata array 124 using its private clock hand to free one or more cache blocks in VM 106(i)'s cache allocation (block 704). In one embodiment, space manager 118(i) can perform this traversal in a manner similar to the data eviction process described with respect to FIG. 1. When an appropriate cache block is found, space manager 118(i) can free the cache block (i.e., allow it to be allocated to other VMs) by setting the VM ID field in the metadata entry for the cache block to NULL. Space manager 118(i) can then repeat block 704 until the new cache allocation size is reached (blocks 706, 712).

If, at block 702, the allocation decision for VM 106(i) is "Increase," space manager 118(i) can continue its normal caching operation. However, when space manager 118(i) encounters a free cache block in the global pool during its normal operation, space manager 118(i) can claim the free cache block by setting the block's VM ID field to identify VM 106(i) (block 708). Space manager 118(i) can continue to claim free cache blocks in this manner until the new cache allocation size is reached (blocks 710, 712).

In certain embodiments, the reallocation enforcement approach shown in FIG. 7 relies on a reasonable number of free cache blocks in the global pool in order for a VM with an expanded cache allocation to timely reach its allocated size. To ensure such free cache blocks are readily available, hypervisor 104 can execute a "global cleaning" process that periodically frees cache blocks in the global pool (regardless of VM ownership) using a global clock hand.

In particular, the global cleaning process can operate in accordance with two predefined watermarks: a high watermark and a low watermark. When the total amount of free cache blocks in the global pool falls below the low watermark, the global cleaning process can traverse global pool metadata array 124 with the global clock hand and free one or more least recently used cache blocks. The global cleaning process can continue freeing cache blocks in the way until the high watermark is reached. The global cleaning process can then go to sleep and reactivate when the low watermark is reached again. In one embodiment, the low watermark can be set at 1% of the global pool size and the high watermark can be set at 5% of the global pool size.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for managing space in a flash storage-based cache, the method comprising:
    calculating, by a computer system, ratio of effective cache space (rECS) values for a plurality of VMs, each VM in the plurality of VMs having a cache allocation comprising a subset of a global pool of cache blocks in the flash storage-based cache, the rECS value for the VM indicating a proportion of the subset that has been populated with cached data and re-accessed by the VM within a current time window;
    determining, by the computer system, a new cache allocation size for at least one VM in the plurality of VMs based on the rECS values; and
    adjusting, by the computer system, a number of cache blocks in the at least one VM's cache allocation based on the new cache allocation size.

2. The method of claim 1 wherein determining the new cache allocation size for the at least one VM comprises, for each VM on the plurality of VMs:
    generating a composite rECS value for the VM by combining the VM's rECS value with a previous rECS value calculated for the VM during a previous time window; and
    generating a score value for the VM by calculating a difference between the composite rECS value and the previous rECS value.

3. The method of claim 2 wherein determining the new cache allocation size for the at least one VM further comprises:
    identifying a first VM in the plurality of VMs having the highest score value and a second VM in the plurality of VMs having the lowest score value;
    increasing the first VM's cache allocation size; and
    if the second VM's cache allocation size was not reduced during the previous time window, decreasing the second VM's cache allocation size.

4. The method of claim 3 wherein the first VM's cache allocation size is increased by an allocation value that is based on an average number of data blocks accessed by the first VM from a backend storage system over one or more recent time windows.

5. The method of claim 1 wherein the computer system maintains an array of metadata entries for the flash storage-based cache, each metadata entry corresponding to a cache block in the global pool of cache blocks and including an identifier that identifies a VM to which the cache block is allocated and a counter indicating whether the cache block has been re-accessed, and wherein calculating the rECS values for the plurality of VMs comprises sampling a subset of the metadata entries during the current time window.

6. The method of claim 1 wherein adjusting the number of cache blocks in the at least one VM's cache allocation based on the new cache allocation size comprises:
   if the new cache allocation size is larger than a previous cache allocation size for the at least one VM, freeing a necessary amount of least recently used cache blocks in the VM's cache allocation until the new cache allocation size is reached; and
   if the new cache allocation size is smaller than the previous cache allocation size for the at least one VM, claiming free cache blocks in the global pool of cache blocks until the new cache allocation size is reached.

7. The method of claim 6 further comprising:
   if a total number of free cache blocks in the global pool of cache blocks falls below a low watermark, freeing least recently used cache blocks until the number of free cache blocks in the global pool reaches a high watermark.

8. A non-transitory computer readable storage medium having stored thereon computer software executable by a processor, the computer software embodying a method for managing space in a flash storage-based cache, the method comprising:
   calculating ratio of effective cache space (rECS) values for a plurality of VMs, each VM in the plurality of VMs having a cache allocation comprising a subset of a global pool of cache blocks in the flash storage-based cache, the rECS value for the VM indicating a proportion of the subset that has been populated with cached data and re-accessed by the VM within a current time window;
   determining a new cache allocation size for at least one VM in the plurality of VMs based on the rECS values; and
   adjusting a number of cache blocks in the at least one VM's cache allocation based on the new cache allocation size.

9. The non-transitory computer readable storage medium of claim 8 wherein determining the new cache allocation size for the at least one VM comprises, for each VM in the plurality of VMs:
   generating a composite rECS value for the VM by combining the VM's rECS value with a previous rECS value calculated for the VM during a previous time window; and
   generating a score value for the VM by calculating a difference between the composite rECS value and the previous rECS value.

10. The non-transitory computer readable storage medium of claim 9 wherein determining the new cache allocation size for the at least one VM further comprises:
    identifying a first VM in the plurality of VMs having the highest score value and a second VM in the plurality of VMs having the lowest score value;
    increasing the first VM's cache allocation size; and
    if the second VM's cache allocation size was not reduced during the previous time window, decreasing the second VM's cache allocation size.

11. The non-transitory computer readable storage medium of claim 10 wherein the first VM's cache allocation size is increased by an allocation value that is based on an average number of data blocks accessed by the first VM from a backend storage system over one or more recent time windows.

12. The non-transitory computer readable storage medium of claim 8 wherein the computer system maintains an array of metadata entries for the flash storage-based cache, each metadata entry corresponding to a cache block in the global pool of cache blocks and including an identifier that identifies a VM to which the cache block is allocated and a counter indicating whether the cache block has been re-accessed, and
    wherein calculating the rECS values for the plurality of VMs comprises sampling a subset of the metadata entries during the current time window.

13. The non-transitory computer readable storage medium of claim 8 wherein adjusting the number of cache blocks in the at least one VM's cache allocation based on the new cache allocation size comprises:
    if the new cache allocation size is larger than a previous cache allocation size for the at least one VM, freeing a necessary amount of least recently used cache blocks in the VM's cache allocation until the new cache allocation size is reached; and
    if the new cache allocation size is smaller than the previous cache allocation size for the at least one VM, claiming free cache blocks in the global pool of cache blocks until the new cache allocation size is reached.

14. The non-transitory computer readable storage medium of claim 13 further comprising:
    if a total number of free cache blocks in the global pool of cache blocks falls below a low watermark, freeing least recently used cache blocks in the global pool until the number of free cache blocks reaches a high watermark.

15. A system for managing space in a flash storage-based cache, the system comprising:
    a processor; and
    a non-transitory computer readable medium having stored thereon program code that, when executed by the processor, causes the processor to:
       calculate ratio of effective cache space (rECS) values for a plurality of VMs, each VM in the plurality of VMs having a cache allocation comprising a subset of a global pool of cache blocks in the flash storage-based cache, the rECS value for the VM indicating a proportion of the subset that has been populated with cached data and re-accessed by the VM within a current time window;
       determine a new cache allocation size for at least one VM in the plurality of VMs based on the rECS values; and
    adjust a number of cache blocks in the at least one VM's cache allocation based on the new cache allocation size.

16. The system of claim 15 wherein the program code that causes the processor to determine the new cache allocation size for the at least one VM comprises program code that causes the processor to, for each VM in the plurality of VMs:
    generate a composite rECS value for the VM by combining the VM's rECS value with a previous rECS value calculated for the VM during a previous time window; and
    generate a score value for the VM by calculating a difference between the composite rECS value and the previous rECS value.

17. The system of claim 16 wherein the program code that causes the processor to determine the new cache allocation size for the at least one VM further comprises program code that causes the processor to:
    identify a first VM in the plurality of VMs having the highest score value and a second VM in the plurality of VMs having the lowest score value;
    increase the first VM's cache allocation size; and
    if the second VM's cache allocation size was not reduced during the previous time window, decrease the second VM's cache allocation size.

18. The system of claim 17 wherein the first VM's cache allocation size is increased by an allocation value that is based on an average number of data blocks accessed by the first VM from a backend storage system over one or more recent time windows.

19. The system of claim 15 wherein the computer system maintains an array of metadata entries for the flash storage-based cache, each metadata entry corresponding to a cache block in the global pool of cache blocks and including an identifier that identifies a VM to which the cache block is allocated and a counter indicating whether the cache block has been re-accessed, and wherein the program code that causes the processor to calculate the rECS values for the plurality of VMs comprises program code that causes the processor to sample a subset of the metadata entries during the current time window.

20. The system of claim 15 wherein the program code that causes the processor to adjust the number of cache blocks in the at least one VM's cache allocation based on the new cache allocation size comprises program code that causes the processor to:

if the new cache allocation size is larger than a previous cache allocation size for the at least one VM, free a necessary amount of least recently used cache blocks in the VM's cache allocation until the new cache allocation size is reached; and if the new cache allocation size is smaller than the previous cache allocation size for the at least one VM, claim free cache blocks in the global pool of cache blocks until the new cache allocation size is reached.

21. The system of claim 20 wherein the program code further causes the processor to:

if a total number of free cache blocks in the global pool of cache blocks falls below a low watermark, free least recently used cache blocks in the global pool until the number of free cache blocks reaches a high watermark.

* * * * *